(12) United States Patent
Mendonsa et al.

(10) Patent No.: US 11,449,238 B2
(45) Date of Patent: Sep. 20, 2022

(54) LOW COST DATA STORAGE SYSTEM

(71) Applicant: Seagate Technology LLC, Fremont, CA (US)

(72) Inventors: Riyan A. Mendonsa, Edina, MN (US); Brett R. Herdendorf, Mound, MN (US); Jon D. Trantham, Chanhassen, MN (US); Krishnan Subramanian, Shakopee, MN (US); John E. Moon, Superior, CO (US); Hemant Mane, Pune (IN)

(73) Assignee: SEAGATE TECHNOLOGY LLC

( * ) Notice: Subject to any disclaimer, the term of this patent is extended or adjusted under 35 U.S.C. 154(b) by 0 days.

(21) Appl. No.: 16/948,984

(22) Filed: Oct. 8, 2020

(65) Prior Publication Data
US 2021/0109662 A1    Apr. 15, 2021

Related U.S. Application Data

(60) Provisional application No. 62/914,029, filed on Oct. 11, 2019.

(51) Int. Cl.
*G06F 3/06* (2006.01)
*G06F 11/34* (2006.01)

(52) U.S. Cl.
CPC ............ *G06F 3/0619* (2013.01); *G06F 3/061* (2013.01); *G06F 3/0653* (2013.01); *G06F 3/0659* (2013.01); *G06F 3/0683* (2013.01); *G06F 11/3409* (2013.01)

(58) Field of Classification Search
CPC ............ G06F 11/3034; G06F 11/3409; G06F 11/3485; G06F 3/0604; G06F 3/061; G06F 3/0619; G06F 3/0653; G06F 3/0658; G06F 3/0659; G06F 3/0683
See application file for complete search history.

(56) References Cited

U.S. PATENT DOCUMENTS

| | | | |
|---|---|---|---|
| 6,570,734 B2 | 5/2003 | Ostwald et al. | |
| 8,116,075 B2 | 2/2012 | Hall et al. | |
| 8,233,231 B2 | 7/2012 | Thompson et al. | |
| 9,036,291 B1 | 5/2015 | Nava et al. | |
| 9,087,041 B2 | 7/2015 | Weir | |
| 10,406,262 B2 | 9/2019 | Bonassar et al. | |
| 10,503,427 B2 | 12/2019 | Botes et al. | |
| 10,592,357 B2 | 3/2020 | Vijayan et al. | |
| 10,668,622 B2 | 6/2020 | Pollack | |
| 2011/0157742 A1* | 6/2011 | Thompson | G11B 20/1803 360/92.1 |

* cited by examiner

*Primary Examiner* — Yong J Choe
(74) *Attorney, Agent, or Firm* — Hall Estill Law Firm

(57) ABSTRACT

A data storage system can provide low cost and optimized performance with a cartridge housing multiple separate data storage devices and each of the data storage devices being concurrently engaged by a device player. The device player may have a processor configured to analyze mechanical performance of each data storage device and data performance of data resident in each data storage device.

20 Claims, 4 Drawing Sheets

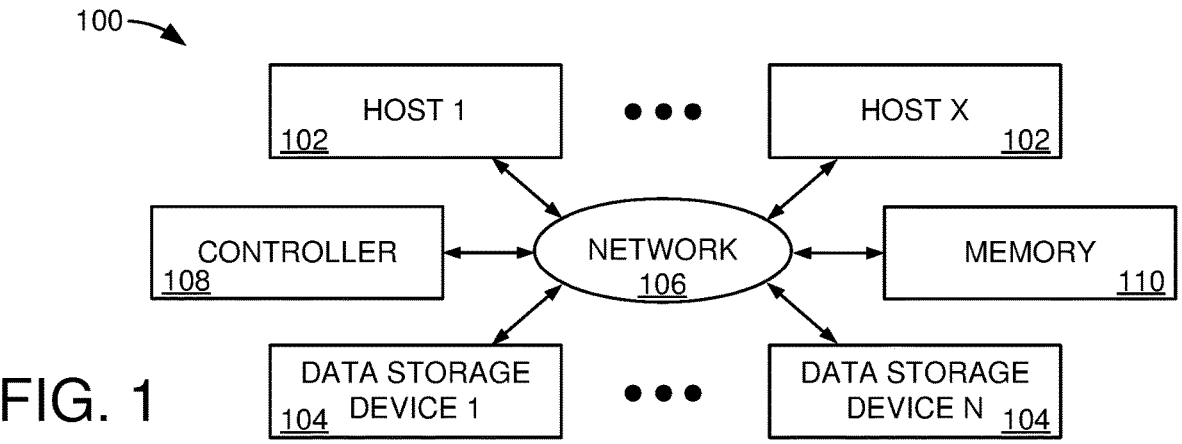
FIG. 1
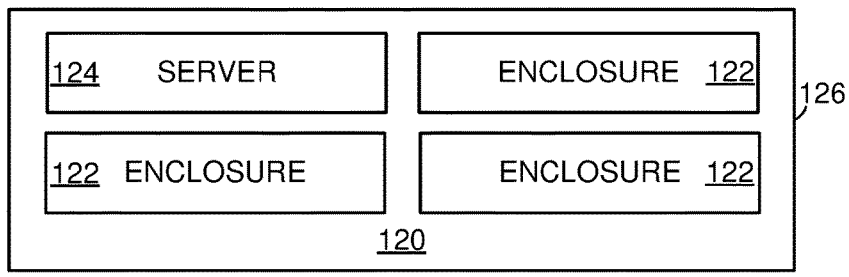
FIG. 2
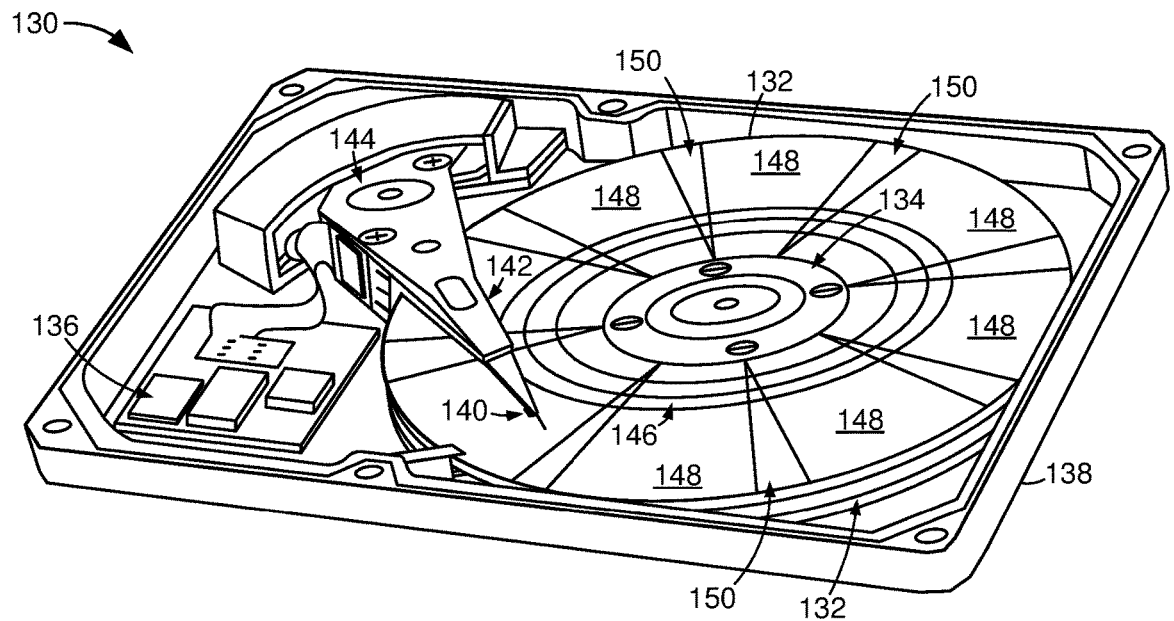
FIG. 3
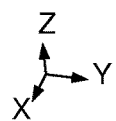

LOW COST DATA STORAGE SYSTEM

RELATED APPLICATION

The present application claims priority to U.S. Provisional Patent Application No. 62/914,029 filed Oct. 11, 2019, the contents of which is hereby incorporated by reference.

SUMMARY

A data storage system, in accordance with various embodiments, has a cartridge housing multiple separate data storage devices and each of the data storage devices being concurrently engaged by a device player. The device player has a processor configured to analyze mechanical performance of each data storage device and data performance of data resident in each data storage device.

BRIEF DESCRIPTION OF THE DRAWINGS

FIG. 1 is a block representation of an example data storage system in which assorted embodiments can be practiced.

FIG. 2 depicts a block representation of an example data storage assembly that can be used in the data storage system of FIG. 1.

FIG. 3 depicts portions an example data storage device that can be employed in the data storage system of FIG. 1 and data storage assembly of FIG. 2.

DETAILED DESCRIPTION

Figure 4:
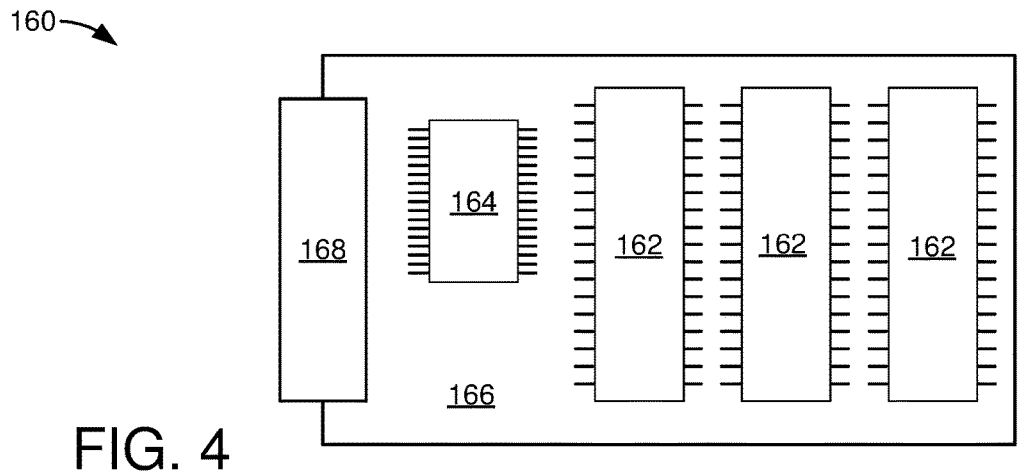
FIG. 4 depicts portions of an example data storage device that may be utilized in the data storage system of FIG. 1 and data storage assembly of FIG. 2.

The present disclosure generally provides assorted embodiments of a data storage system providing high data storage performance with a relatively low cost.

With traditional cloud data storage all the data is sent from where it was generated on the edge to large arrays of hard drives in the cloud. The data then read from the drives and sent to server for analysis. The analysis data is then sent back to the cloud storage. This creates a very large amount of network traffic leading to high costs for ingress/egress. Also since the cloud storage is an array of high performing drives it is not the most economical place to store sensor data that is typically very low access and the ingress/egress cost leads to less usage of the data.

Accordingly, one solution is to have a low cost edge storage device such as CLASS (Cartridge Library Archival Storage System) or CLiFF (Cartridge Library in Form Factor) with computational power to perform the data analysis and only send the analysis results to the cloud. The original raw data is then retained on the low cost edge storage. Another solution is to have a similar device as part of the cloud storage system with low level computational power in the cold storage tier of the cloud. Since CLASS and CLiFF, both have a minimum amount of electronics shared by a large number of drives, this reduces the overall cost of the computational component. For example, a single cartridge player and processing board can gather the status and performance of dozens of separate cartridges in a data storage system.

FIG. 1 conveys a functional block representation of an example distributed data storage system 100 in which assorted embodiments can be practiced. A number (X) of remote hosts 102 can be connected to a number (N) of data storage devices 104 via a network 106 that consists of one or more wired and/or wireless signal pathways. The network 106 can further consist of control components, such as a controller 108, memory 110, and assorted distribution circuits, to conduct various data storage, retrieval, distribution, and maintenance with the assorted data storage devices 104. It is contemplated, but not required, that the network 106 can connect one or more hosts 102 with network components, such as a node, server, repeater, and switch, that provides computing and/or data storage capabilities to the system 100.

FIG. 2 displays a block representation of portions of an example data storage assembly 120 that can be incorporated into the distributed data storage system 100 of FIG. 1. While a data storage device 104 can be a single memory, such as a single rotating hard disk drive (HDD), solid-state drive (SDD), or a hybrid combination thereof, some embodiments arrange a data storage device 104 as a collection of multiple separate memories/drives. The data storage assembly 120 depicts an example multi-memory collection where a number of data enclosures 122 are accessed via a local server 124.

It is contemplated that each data enclosure 122 contains one or more separate memories/drives positioned within a common case to allow for efficient power, control, and cooling. Having individual memories/drives in a single enclosure 122 further allows for efficient removal, installation, and swapping of memories/drives upon failure, error, filled storage capacity, or removal from service. Any number of data enclosures 122 can be individually, and concurrently operated as directed by the local server 124 and any upstream data control, such as the network controller 108 and/or hosts 102.

In some embodiments, multiple enclosures 122 are physically positioned within a single rack 126, which allows for efficient space utilization and cooling. One or more control circuits, such as the server 124, a switch, a power distribution hub, and a router, can be physically located within the rack 126 along with the memories/drives that the control circuits control. The physical location of a server 124, however, does not limit the ability of control circuits to be connected to, and direct data operations with, memories/drives positions outside of the rack 126 that houses the server 124.

FIG. 3 depicts portions of an example data storage device 130 that can be utilized in the data storage system 100 of FIG. 1. The device 130 positions a plurality of data storage media 132 are vertically stacked and aligned about a spindle 134 that can selectively spin the media 132 as directed by a local controller 136 resident in a circuit board packaged in a single sealed, or unsealed, housing 138 with the media 132. The controller 136 can additionally direct operation of one or more transducing heads 140 positioned at a distal end of a suspension 142 from an actuator 144 that selectively moves the respective heads 140 over different tracks 146 spaced throughout the media 132.

The line representation of an example data track 146 depicts how magnetic portions of a data storage medium 132 can be logically divided into different zones enforced by the local controller 136. The data track 146 can have a number of user data regions 148 where end-user data is stored, and retrieved, to service data access requests from one or more remote hosts. The user data regions 148 positioned circumferentially around a data storage medium 132 can be separated by servo regions 150 where non-user generated, system data is stored and not accessible by an end user of the data storage device 130. The servo regions 150 may be arranged as radially extending wedges or continuous spirals that provide information, such as grey code, error correction, position error sensing, and data track gates, for each data track 146.

FIG. 4 depicts portions of an example data storage device 160 that can be employed in a data storage system in accordance with various embodiments. The data storage device 160 can interconnect one or more solid-state memory modules 162 with a local controller 164 on a single substrate 166, such as a printed circuit board. The substrate 166 can provide electrical interconnections with external equipment via one or more edge connectors 168 that allow the data storage device 160 to be incorporated into a larger data storage assembly, such as the enclosure 122 of FIG. 2, and/or into a distributed data storage network.

It is noted that the data storage device 160 may have stand-alone operational capabilities, such as with a power source and communication means attached to the substrate 166. However, the data storage device 160 may alternatively not have stand-alone operational capabilities and require connection to external electrical power and data distribution means. Regardless of the stand-alone capabilities of the data storage device 160, the solid-state memory module 162 can provide relatively fast data access and large data capacities compared to rotating magnetic media storage. In yet, the solid-state memory modules 162 can be plagued by increased operational complexity, such as with translation tables and garbage collection units, as well as a limited operational lifespan due to memory cells degrading with use. Hence, various embodiments of a low cost data storage system can utilize different types of data storage, such as rotating media, rewritable in-place solid-state memory, and non-rewritable in-place memory, alone, or in combination, to provide optimal short-term and long-term data storage performance.

Figure 5:
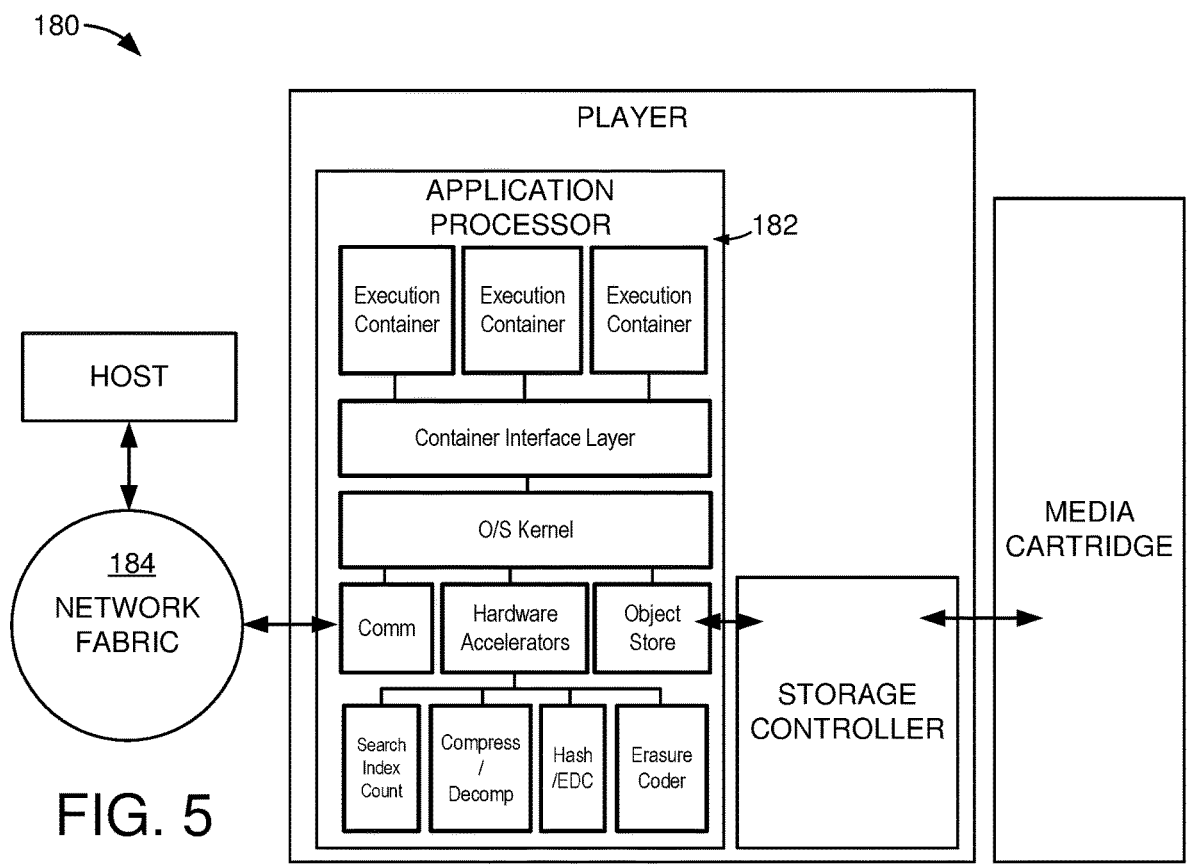
FIG. 5 depicts portions of an example data storage system arranged and operated in accordance with assorted embodiments.

FIG. 5 shows an example low cost data storage system 180 architecture arranged in accordance with some embodiments to provide data and/or memory analysis computation at the player level. The exemplary hardware of FIG. 5 consists of an application processor 182, such as an advanced reduced instruction set computer machine (ARM), a reduced instruction set computer five (RISC-V), microprocessor, or other programmable circuity. The processor 182 is coupled to a network fabric 184, such as via a NIC (a network interface controller). The NIC can be part of the processor 182 or a separate device, such as a PCIe-attached peripheral.

It is noted that data computations are not limited to central processing units {CPUs} as shown in FIG. 5, but may be any kind of computational architecture. The hardware may be augmented by specialized hardware, such as machine learning hardware, cryptographic hardware, or other artificial intelligence. The software implementation is similarly flexible. For example, software can be pre-installed special purpose software that can be applets that are loaded into execution containers, or can be a full operating system running programs at the customer's discretion. As such, the computational boards can be customizable and not with a fixed architecture across the library The assorted embodiments of the low cost data storage system 180 can be realized in at least MRI data analysis, medical/health care records processing, geological data, such as oil & gas mining, seismic records for earthquake prediction, weather/climate data, movies & videos streaming, governmental records processing, drone data, surveillance data, genomics data, such as DNA sequences, autonomous vehicles, road condition data, traffic data, factory/automation quality, augmented reality (AR) data, virtual reality (VR) data, and research and lab data.

Figure 6:
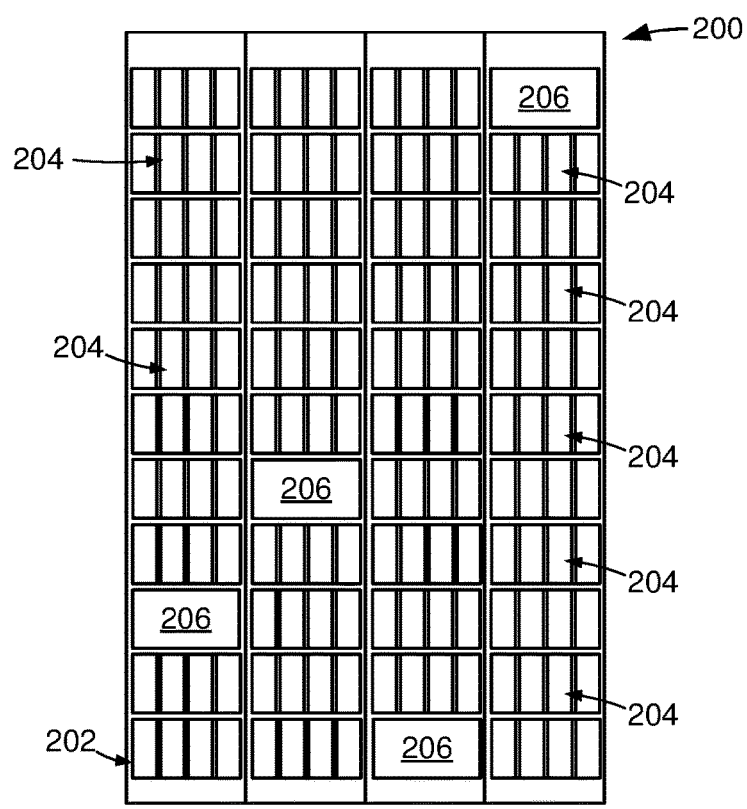
FIG. 6 depicts portions of an example data storage system configured in accordance with some embodiments.

An example of the computational aspects of a low cost data storage system 200 can be seen in FIG. 6 where 4 data storage devices packaged in a cartridge 202 are connected to a cartridge player 204 consisting of a computational processor board 206 when in use. As illustrated, multiple cartridges 202 of multiple devices can be concurrently engaged and accessed by different players 204. However, such function is not required or limiting as a single player 204, or single processor board 206, can engage and access multiple different cartridges 202 and the constituent data storage devices. As such, one or more cartridge players 204 and computational processor board 206 can be used to access the remaining 56 cartridges 202 loaded into the rack 208 when necessary.

Figure 7:
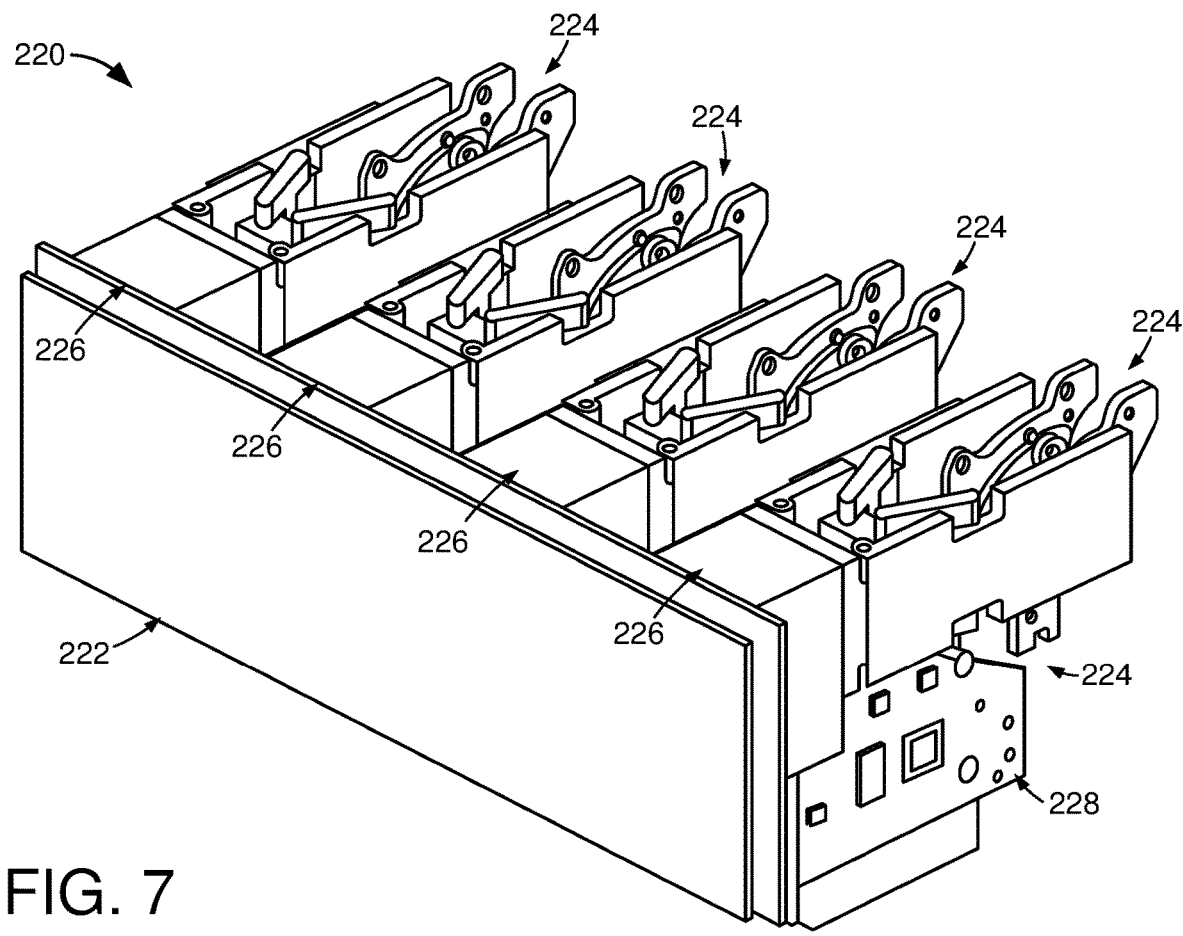
FIG. 7 depicts portions of an example data storage system constructed and operated in accordance with various embodiments.

FIG. 7 shows portions of an example cartridge player 220 configured and operated in accordance with some embodiments in a low cost data storage system. The player 220 has a computational processor board 222 that supports and electrically enables activation, movement, and analysis of data resident in data storage devices 224 connected to the respective docks 226. The computational processor board 222 can consist of one or more controllers and/or programmable processors that can operate independently or in conjunction with local device controllers of the respective connected data storage devices 224 to conduct at least one data analysis operation where at least data access performance is ascertained.

While not limiting, the analysis of data access performance of a data storage device 224 can involve any number of data reads and/or data writes of user-generated and/or test data to evaluate the current, real-time capabilities and metrics of the data storage device 224 itself as well as the data resident on the device. For instance, the board 222 can direct a test pattern of data accesses to test the mechanical operation of the data storage device 224 and/or the integrity of the resident data. That is, analysis in the player 220 can provide information about the reliability, current performance, and predictable future performance of the mechanical aspects of a device 224 and the data stored on the device 224.

The ability to test multiple devices 224 concurrently with a single board 222 increases efficiency and increases the reliability of a data storage system employing numerous data storage devices 224, such as the two hundred and forty devices residing in the common rack 208 of FIG. 6. With multiple separate players operating on a rack concurrently, as shown in FIG. 6, a variety of different verifications and analyses can be conducted redundantly, or sequentially, by the respective players, which increases the efficiency of device analysis without increasing the overall computational requirement or complexity of a player.

Figure 8:
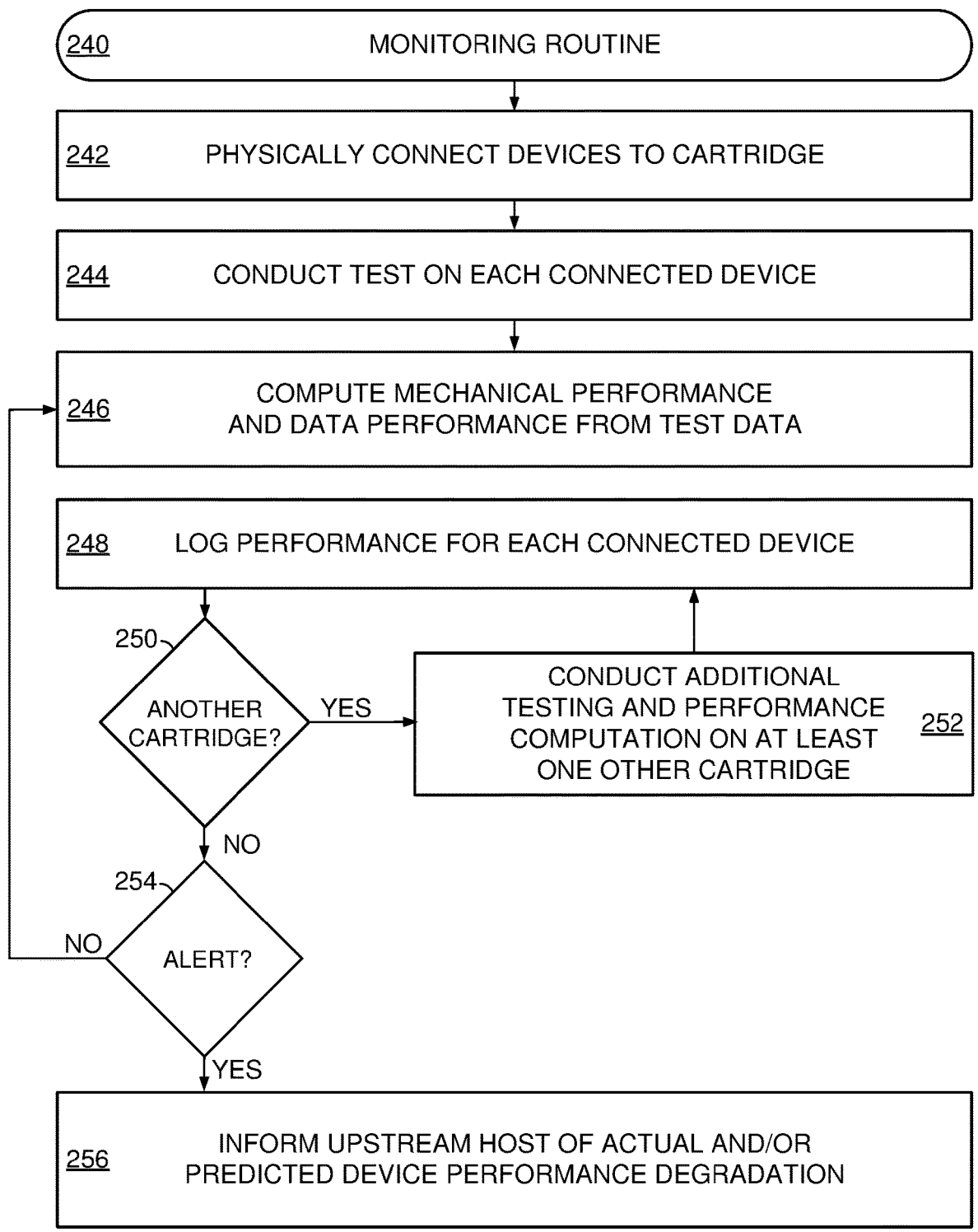
FIG. 8 depicts an example monitoring routine that can be carried out by the assorted embodiments of FIGS. 1-7.

FIG. 8 depicts an example monitoring routine 240 that can be conducted by the assorted embodiments of FIGS. 1-7 to provide cost and time efficient tracking of at least mechanical and data performance of separate data storage devices.

Step 242 begins by physically attaching and electrically connecting multiple data storage devices to a cartridge. A device player of the cartridge proceeds to conduct one or more tests on each of the connected data storage devices to determine current, real-time mechanical performance in step 244. It is contemplated that step 244 tracks the integrity of data stored on the respectively connected data storage devices by conducting tests and/or by monitoring the performance metrics, such as error rate, access latency, and age of data, of satisfying data access requests from upstream host(s).

The gathered mechanical and data information and metrics are then computed locally by the processor of the cartridge player in step 246. The use of the local player instead of an upstream server, or other controller, to compute data storage device performance allows the upstream data storage system components to more efficiently allocate system resources to the satisfaction of data access requests quickly and reliably. Computed data storage device performance is logged in step 248 to allow for future comparison and efficient prediction of device behavior, such as via pattern recognition and/or performance degradation precursor events and triggers.

While steps 244, 246, and 248 can be cyclically carried out to continuously, or sporadically, track the performance of each connected data storage device, some embodiments evaluate if a cartridge player can be utilized by other cartridges in decision 250. If a separate cartridge is not physically connected to a player or if an attached player of a cartridge is unavailable, step 252 can utilize a separate player to test and track at least the mechanical and data performance of the data storage devices attached to the separate cartridge. It is contemplated that step 252 can be carried out repeatedly for multiple separate cartridges, which corresponds with a single player testing and tracking the performance of numerous data storage devices housed in multiple different cartridges.

At the conclusion of step 252, the computed performance is logged in step 248. In the event decision 250 does not conduct additional cartridge testing and tracking, decision 254 evaluates if current, or future, performance determined by the player processor triggers an alert to an upstream host. If so, step 256 informs at least one upstream host of an actual, or predicted, performance degradation condition in one or more data storage devices. Such altering allows for proactive and reactive actions to mitigate, or eliminate, the degradation of mechanical performance and/or data performance, which corresponds with increased data access performance consistency.

The various embodiments of a data storage system can provide access to multiple cartridges simultaneously, such as at least 4 cartridges, but such a number can be changed depending on the hardware design. As above, the processor board is designed to service the 4 drives simultaneously, but the configuration can be edited to serve any of the cartridges concurrently and/or sequentially. Such a low cost data storage system can conduct computation at the player level while other computations, as part of the overall data storage system, can be at the drawer or even rack level. At such higher levels, the distribution of the cost over more devices makes the cost of compute even cheaper. The higher levels further allows for parallel processing of multiple data streams. It is contemplated that the computational module can be integrated at the cartridge PCBA level 228.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising multiple separate data storage devices each concurrently engaged by a device player as part of a cartridge, the device player comprising a processor and each data storage device respectively comprising a local controller, the processor configured to analyze mechanical performance of each data storage device and data performance of data resident in each data storage device during the satisfaction of data access requests to the respective data storage devices from one or more upstream host.

2. The apparatus of claim 1, wherein the data performance is data integrity corresponding to error rate.

3. The apparatus of claim 1, wherein the processor compiles the mechanical performance and data performance prior to sending to a host via a connected network.

4. The apparatus of claim 1, wherein each data storage device is a hard disk drive comprising a rotating magnetic medium.

5. The apparatus of claim 1, wherein each local controller is configured to conduct data access operations to local memory of one of the multiple separate data storage devices.

6. The apparatus of claim 1, wherein each local controller and the processor conduct data access operations to local memory of the respective data storage devices.

7. An apparatus comprising multiple separate data storage devices each concurrently engaged by a device player as part of a cartridge, the device player comprising a processor and each data storage device respectively comprising a local controller, the processor dedicated to testing and tracking mechanical performance of each data storage device and data performance of data resident in each data storage device in response to writing a test pattern to at least one of the multiple separate data storage devices, as directed by the processor.

8. The apparatus of claim 7, wherein an upstream storage controller conducts data access operations to local memory of the respective data storage devices.

9. The apparatus of claim 7, wherein the processor concurrently tests and tracks the mechanical performance and data performance of each connected data storage device.

10. The apparatus of claim 7, wherein each multiple separate data storage device is interchangeable with the device player.

11. The apparatus of claim 7, wherein the processor predicts future mechanical performance of at least one data storage device in response to the tested and tracked mechanical performance.

12. The apparatus of claim 7, wherein the cartridge comprises four separate data storage devices.

13. A system comprising a rack physically supporting a plurality of cartridges, a first cartridge of the plurality of cartridges and a second cartridge of the plurality of cartridges each respectively comprising a player connected to multiple separate data storage devices, each data storage device of the first cartridge and second cartridge respectively comprising a local controller and concurrently engaged by the player, the player comprising a processor configured to track mechanical performance of each data storage device and data performance of data resident in each data storage device during the satisfaction of data access requests to the respective data storage devices from one or more upstream host.

14. The system of claim 13, wherein a player of the first cartridge tracks mechanical performance and data performance of data storage devices connected to the second cartridge in the rack.

15. The system of claim 13, wherein a third cartridge of the plurality of cartridges in the rack lacks a connected player.

16. The system of claim 13, wherein a player of the first cartridge concurrently tracks mechanical performance and data performance of data storage devices attached to more than two separate cartridges of the plurality of cartridges.

17. The system of claim 13, wherein the player tracks mechanical performance by writing at least one test pattern to at least one data storage device of a cartridge of the plurality of cartridges.

18. The system of claim 13, wherein the player analyzes tracked mechanical performance and data performance instead of an upstream server connected to the plurality of cartridges.

19. The system of claim 13, wherein the processor computes mechanical performance and data performance from a plurality of tracked metrics pertaining to the respective data storage devices of a cartridge of the plurality of cartridges.

20. The system of claim 13, wherein the first cartridge exports a first set of data to an upstream server while the second cartridge exports a second set of data to the upstream server.

* * * * *